United States Patent [19]
Sawano et al.

[11] Patent Number: 5,642,203
[45] Date of Patent: Jun. 24, 1997

[54] METHOD OF ENLARGING AND PROCESSING IMAGE DATA

[75] Inventors: Yukio Sawano, Tokyo; Shuzo Hanaoka, Nagano, both of Japan

[73] Assignees: Fuji Photo Film Co., Ltd., Kanagawa; Nagano Japan Radio Co., Ltd., Nagano-ken, both of Japan

[21] Appl. No.: 337,811

[22] Filed: Nov. 8, 1994

[30] Foreign Application Priority Data

Nov. 19, 1993 [JP] Japan ..................... 5-314169

[51] Int. Cl.$^6$ ..................... H04N 1/393
[52] U.S. Cl. ..................... 358/451; 382/298
[58] Field of Search ..................... 358/451, 447, 358/448, 456, 296; 382/298, 256, 257, 258, 266

[56] References Cited

U.S. PATENT DOCUMENTS

| | | | |
|---|---|---|---|
| 4,611,349 | 9/1986 | Hou | 382/298 |
| 5,202,670 | 4/1993 | Oha | 358/451 |
| 5,294,998 | 3/1994 | Piovoso et al. | 358/451 |
| 5,351,137 | 9/1994 | Kato et al. | 358/456 |
| 5,365,602 | 11/1994 | Levien | 358/451 |
| 5,387,985 | 2/1995 | Loce et al. | 358/451 |
| 5,467,203 | 11/1995 | Kawata | 358/451 |

FOREIGN PATENT DOCUMENTS 4-287568  10/1992  Japan.

*Primary Examiner*—Edward L. Coles, Sr.
*Assistant Examiner*—Fan Lee

[57] ABSTRACT

In obtaining image data of an enlargement factor $\alpha$ by which the image data is enlarged and processed by multiplication with a non-integer number, the image data are firstly contracted and processed to a contraction factor $\beta=\alpha/\gamma$, wherein $\gamma$ is an integer satisfying $\alpha<\gamma$. Then, the contraction-processed image data are subjected to pseudo half tone processing. Thereafter, the pseudo half tone processed image data are enlarged and processed by a factor $\gamma$ times. The contraction factor $\beta$ is selected as a value equal to or more than 50%. Thereby, even for an enlargement factor which requires multiplication by a non-integer number, visual image quality is upgraded, processing data amount is reduced and memory capacity is lowered, thus resulting in a lower cost.

16 Claims, 2 Drawing Sheets

METHOD OF ENLARGING AND PROCESSING IMAGE DATA

BACKGROUND OF THE INVENTION

I. Field of the Invention

This invention relates to a method of enlarging and processing image data used for an enlarging copy machine which enlarges and prints the image data read from documents.

II. Description of the Background Art

Heretofore known is an enlarging copy machine in which the documents with a paper size of A4 or the like including a half tone image are read by an image sensor, thus read image data are data-processed and thereafter enlarged into a large size such as A1 or A0, and printed.

Conventionally, the image data in the enlarging copy machine of this kind are enlarged and processed as described below.

The image data before enlarging process including photographic density information are converted into pseudo half tone image data by pseudo half tone processing, where the pseudo half tone process ordinarily uses an error diffusion method, for example, the image data are converted into binary data so that the half tone density of 64 gradations is expressed by a density of dot pixels.

The pseudo half tone image data are enlarged, for example, by an enlarging and processing method disclosed in Japanese Patent Application Laid Open No. Hei-4-287568 in 1992. In the disclosure, the pseudo half tone image data are multiplied by an integer number, thereafter by calculating thus enlarged data, image data of a multi-valued density is produced. Such image data is then subjected to a thinning process, where the pseudo half tone image data are varied to an optional size. The image data of the varied multi-valued density are converted into binary digit data.

However in such conventional method of enlarging and processing, when enlarging by an integer multiplying number such as twice or three times, respective dot data in the image data are equivalently enlarged, therefore a quality variation does not arise. However in case of multiplying by a non-integer number such as 1.414 times, an image quality, in particular, a visual image quality is considerably deteriorated disadvantageously. One cause of such is considered that an outline portion of the image is made random (unclear) because a thinning process (or an insertion process of interpolation data) is performed for multiplying by the non-integer number, in addition to the pseudo half tone process using the error diffusion method and which is intrinsically a process in accordance with a periodicity.

SUMMARY OF THE INVENTION

An object of the invention is to provide a method of enlarging and processing image data which is estimated to provide the best effect in a case particularly including a pseudo half tone process to improve visual image quality, even for the case of an enlargement factor for multiplying by a non-integer number.

Another object of the invention is to provide a method of enlarging and processing image data capable of reducing cost by reducing the processing data amount and the memory capacity in a case where the image data are used to produce contraction image data which is further used to produce pseudo half tone image data.

To achieve these objects, according to the present invention, when image data Mi are enlarged and processed by a multiplying non-integer number and converted into the image data of an enlargement factor $\alpha$ to be multiplied by the multiplying non-integer numbers, the image data Mi are firstly contracted and processed to a contraction factor $\beta=\alpha/\gamma$ ($\gamma$ is an integer number satisfying $\alpha<\gamma$. Thereafter, the thus contraction-processed contraction image data Mr are subjected to pseudo half tone image data processing. The pseudo half tone processed data are then enlarged and processed at $\gamma$ times where $\gamma$ is an integer number. A contraction factor $\beta$ is selected to a value equal to or more than 50%.

In such constitution, assuming that $\alpha$ represents an enlargement factor, for example, equal to 141.4%, then image data Mi is firstly contraction-processed by a contraction factor $\beta$ based on a predetermined condition. In more detail, $\gamma=2$ may preferably be selected, thereby a contraction factor $\beta$ is set to $\beta=141.4\%/2=70.7\%$. As a result of this, contraction image data Mr is obtained where the image data Mi is contraction-processed to 70.7%.

Thereafter, the contraction image data Mr is subjected to the pseudo half tone process, thus the pseudo half tone image data Mm is obtained. Thus obtained pseudo half tone image data Mm is enlarged and processed to $\gamma$ times of the enlargement factor with the integer number. Concretely, because $\gamma=2$ is selected, then the enlargement image data enlarged to $70.7\%\times2=141.4\%$ is obtained.

The data amount of the contraction image data Mr for the pseudo half tone processing is contracted to 70.7% for the image data Mi, thus reduction of the data amount enables also a reduction of memory capacity.

The data amount of the contraction image data Mr is contracted to 70.7% for the data amount of the image data Mi, and in theory, the resolution is also lowered to 70.7%. However, due to the pseudo half tone processing in the next stage, deterioration of the resolution does not appear. In particular, with a contraction factor $\beta$ being selected equal to or more than 50%, the resolution is hardly affected therefrom. On the other hand, the contraction image data Mr (pseudo half tone image data Mm) is enlarged by $\gamma$ times in the next stage where $\gamma$ represents the integer number, therefore the thinning process for employing a non-integer multiplying process (or an insertion process of interpolation data) is unnecessary, and as a result of this, the outline portions of the image are not made random (or unclear). This eliminates the adverse effect of deteriorating the image quality and improves visual picture quality.

DETAILED DESCRIPTION OF THE PREFERRED EMBODIMENT

The preferred embodiments according to the invention are described in detail in accordance with the drawings as following.

Figure 2:
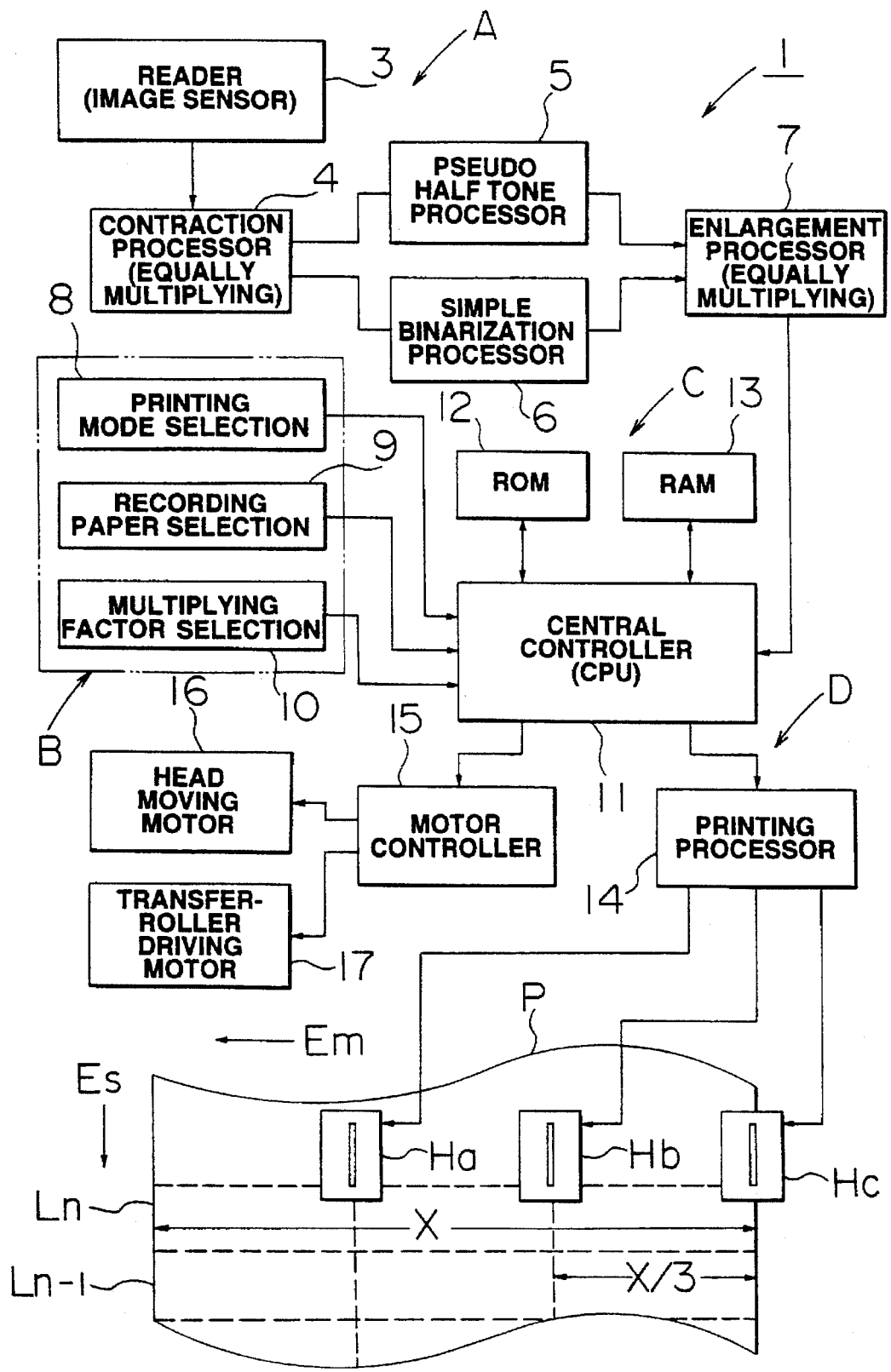
FIG. 2 is a system block diagram of an enlarging copy machine capable of executing a method of enlarging and processing the image data according to an embodiment of the invention.

An enlarging copy machine capable of embodying a method of enlarging and processing image data according to an embodiment of the invention is described referring to FIG. 2.

The drawing shows a system block diagram of the enlarging copy machine. An enlarging copy machine 1 comprises, in large classification, a read processing system A, an operating system B, a control processing system C, and a printing process system D.

The read processing system A comprises, a reader 3 having an image sensor, a contraction processor 4 performing a contraction process, a pseudo half tone processor 5 converting data into pseudo half tone data, a simple binarization processor 6 converting data into simple binarization data, and an enlarging processor 7 performing an enlarging process. In this arrangement, the reader 3 reads documents by the image sensor, and after necessary processes such as A/D converting, the image data is output, the image data are fed to the control processing system C through the contraction processor 4, the pseudo half tone processor 5 or the simple binarization processor 6, and the enlarging processor 7.

In the foregoing, when the equal multiplying factors are selected by a multiplying factor selection key 10 which is described later, then the image data passes through the contraction processor 4 and the enlarging processor 7 as it is. On the other hand, when an enlarging factor for multiplying by an integer number is selected, then the image data pass through the contraction processor 4 as it is, and are enlarged and processed by the enlarging processor 7. When an enlarging factor of multiplying by a non-integer number is selected, then as described later, according to the invention, the image data are first contraction-processed by the enlarging processor 4 and thereafter enlargement-processed by the enlarging processor 7 to thereby obtain a constant enlargement factor. When a binary printing mode is selected by a printing mode selection key 8 described later, then the image data are converted into the binary data of black and white through the simple binarization processor 6, and when the half tone printing mode is selected, then the image data are converted into the pseudo half tone data through the pseudo half tone processor 5. The conversion to the pseudo half tone data uses the error diffusion method, and in the pseudo half tone processor 5, for example, data processing (binarization) for image data is performed so that a half tone density of 64 gradations is expressed by a density of dot pixels.

The operation system B comprises, the printing mode selection key 8 for selecting a binarization printing mode and a half tone printing mode, a recording paper selection key 9 for selecting a kind of the recording paper, and the multiplying factor selection key 10 for selecting a multiplying factor, and in addition, comprises ten keys and various kinds of function keys (not shown). The selection information is fed to the control processing system C.

The control processing system C comprises, a central controller 11 including CPU and the like, a ROM 12 storing control program, and a RAM 13 storing image data and further various data. Moreover, the control processing system C controls the entire enlarging copy machine 1 and executes various arithmetic operations.

The printing process system D comprises, a printing processor 14 including RAM etc for temporarily storing the image data (printing data) in the amount corresponding to one line, and three printing heads Ha, Hb, and Hc. In this configuration, the image data to be printed are fed to each printing head Ha . . . through the printing processor 14, where each printing head Ha . . . uses a serial shaped thermal head in which a large amount (for example, 124 dots) of printing elements (heating elements) are arranged. Each printing head Ha . . . which is arranged in a line direction at every predetermined interval, prints a length equal to three divided length x/3 of an entire line length X in the recording paper P. Thus, a scanning length of the printing head Ha . . . is also equal to X/3. The printing head Ha . . . performs printing as scanning in a right angle direction for an aligning direction of the printing elements. This direction comes to a main scanning direction Em. The recording paper P is intermittently fed in a right angle direction for the main scanning direction, hence the printing is performed sequentially at every line basis $L_{n-1}$, $L_n$ . . . . Such direction is a sub-scanning direction Es.

The printing process system D comprises, a motor controller 15, a head moving motor 16, and a transfer-roller driving motor 17. The head moving motor 16 causes the printing head Ha . . . to move (scan), the transfer-roller driving motor 17 drives a transfer roller (not shown) to intermittently transfer the recording paper P, and each motor 16 and 17 is controlled by the motor controller 15 in accordance with a control instruction from the central controller 11 side.

Figure 1:
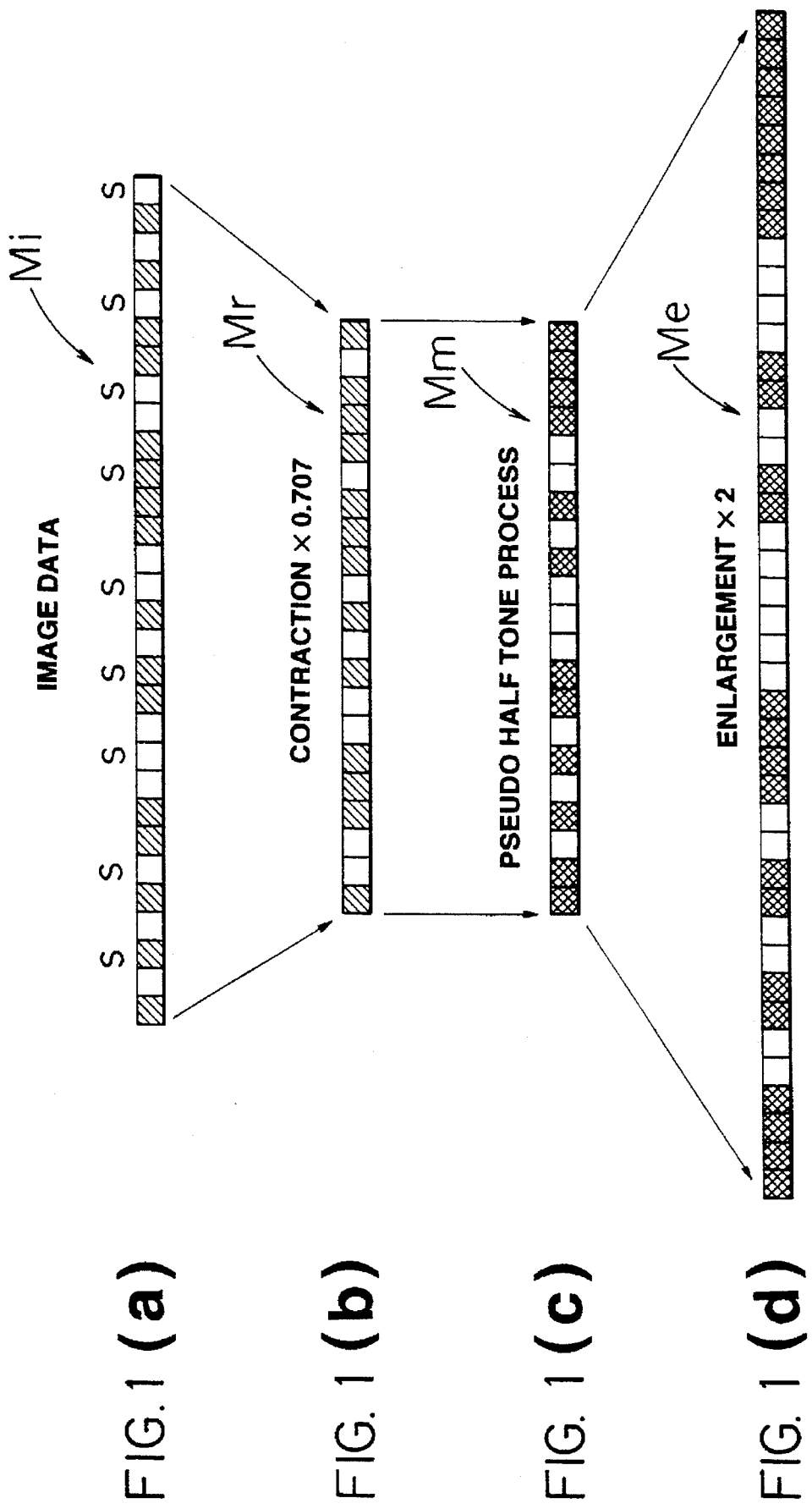
FIGS. 1(a), 1(b), 1(c) and 1(d) are principle illustrations for illustrating a method of enlarging and processing image data according to an embodiment of the invention.

Next, a method of enlarging and processing image data according to the invention is described referring to FIGS. 1 and 2.

The embodiment shows one example of enlarging to 141.4% (1.414 times) by the half tone printing mode. Accordingly in this example, the half tone printing mode is selected by the printing mode selection key 8, and an enlargement factor of 141.4% is selected (set) by the multiplying factor selection key 10.

In this arrangement, image data Mi shown in FIG. 1($a$) obtained from the reader 3 is fed to the contraction processor 4, where an enlargement factor of multiplying by the non-integer number is set, and thus a contraction process for the image data Mi is performed by the contraction processor 4. A contraction factor $\beta$ is set to $\beta=\alpha/\gamma$ ($\gamma$ is integer which satisfies $\alpha<\gamma$. In concrete, a value $\gamma$ satisfying such conditional expression is equal to 2, a contraction factor $\beta$ is set to $\beta=141.4\%$ /2=70.7%. Thus, a contraction image data Mr of a contraction factor 70.7% as shown in FIG. 1($b$) is obtained from the contraction processor 4, where a unit of data train in FIG. 1($b$) is white data and black data including density information. The method of contraction in the foregoing contracts in that the image data Mi in FIG. 1($a$) is thinned by thinning data "s" in a predetermined repeating position.

On the other hand, the contraction image data Mr is converted into the pseudo half tone image data Mm in FIG. 1($c$) by the pseudo half tone processor 5, namely, it is converted into a half tone density of 64 gradations by the error diffusion method, and the half tone density is data-processed (binarization) for the contraction image data Mr so that the half tone density is expressed by a density of dot pixels. The pseudo half tone image data Mm is fed to the enlarging processor 7, and enlarged to 2 (–$\gamma$) times, where a method of enlarging is to multiply by twice the number of each dot data in the pseudo half tone image data Mm. Then, there can be obtained an enlarging image data Me in FIG. 1($d$) in which a largeness of each dot data is enlarged by twice. There is obtained enlarged image data Me which are enlarged and processed for the image data Mi by an enlargement factor of 70.7%×2=141.4%.

In the method of enlarging and processing according to an embodiment of the invention, the data amount of the contraction image data Mr for the pseudo half tone processing is contracted to 70.7% for the data amount of the image data Mi, thus a memory capacity is also reduced following reduction of the data amount to be processed. The data amount of the contraction image data Mr is contracted to 70.7% for the data amount of the image data Mi, hence a resolution is reduced to 70.7% in theory, however in the next stage, by the pseudo half tone processing, deterioration of a resolution substantially does not appears, in particular, if a contraction factor $\beta$ equal to or more than 50% is selected, then a resolution is hardly affected therefrom. When reading by a high resolution of an extent of 16 dots/mm for the documents, there can be eliminated an adverse effect to the picture quality due to a lowered resolution. On the other hand, the contraction image data Mr (pseudo half tone image data Mm) are enlarged in the next stage by $\gamma$ times of multiplying by the integer number, the thinning process (or insertion process of interpolation data) for multiplying by the non-integer number is no longer necessary. Resultantly, the outline portion of the image is not made random (unclear), this therefore improves a visual image quality, without an adverse effect of deterioration of a picture quality.

As hereinbefore fully described for the preferred embodiments, the invention is not limited to such embodiments. For example, the embodiments describe the example that the contraction image data is performed with the pseudo half tone process. However, according to the invention, a simple binarization process of the contraction image data may preferably be performed in the same manner. In the embodiments, the invention is applied to the enlarging copy machine as an example. However, the invention may be applied to other utilizations. Furthermore, the various modifications and changes with respect to the detailed constructions, various procedures, and numerals or numbers and the like may be made therein without departing from the scope and spirit of the present invention of the application.

What is claimed is:

1. A method of enlarging and processing image data to obtain image data having an enlargement factor $\alpha$, by which the image data are enlarged and processed by multiplication with the enlargement factor which is a non-integer number, comprising the steps of:

contracting and processing the image data with a contracting factor $\beta=\alpha/\gamma$ to contract the image, wherein $\gamma$ is an integer number satisfying $\alpha<\gamma$; and enlarging and processing the contraction processed image data by $\gamma$ times to enlarge the image, wherein $\gamma$ is an integer number.

2. The method of enlarging and processing image data as claimed in claim 1, wherein said step of enlarging and processing comprises pseudo half tone processing the contraction processed image data and thereafter enlarging the pseudo half tone processed data by $\gamma$ times.

3. The method of enlarging and processing image data as claimed in claim 1, wherein the contraction factor $\beta$ is selected as a value equal to or greater than 50%.

4. The method of enlarging and processing image data as claimed in claim 1, applied to an enlarging copy machine.

5. A copying apparatus comprising:

image sensing means for reading an image and outputting image data corresponding to the read image;

contraction means for contracting the image data to reduce a size of the image by a contraction factor $\beta=\alpha/\gamma$, wherein $\gamma$ is an integer number greater than $\alpha<\gamma$ and $\alpha$ is a target non-integer enlargement factor;

enlargement means for enlarging the contracted image data by $\gamma$ to enlarge the size of the image by the target non-integer enlargement factor; and printing means for printing the enlarged image using the enlarged image data.

6. The copying apparatus of claim 5, wherein said enlargement means performs pseudo half tone processing on the contracted image data prior to enlarging.

7. The copying apparatus of claim 5, wherein $\beta$ is greater than 50%.

8. A method of copying images comprising the steps of:

optically sensing an image to provide image data corresponding to the sensed image;

contracting the image data to reduce a size of the image by a contraction factor $\beta=\alpha/\gamma$, wherein $\gamma$ is an integer number greater than $\alpha<\gamma$ and $\alpha$ is a target non-integer enlargement factor;

enlarging the contracted image data by $\gamma$ to enlarge the size of the image by the target non-integer enlargement factor; and printing the enlarged image using the enlarged image data.

9. The method of copying images of claim 8, wherein said step of enlarging the contracted image data comprises performing pseudo half tone processing on the contracted image data prior to enlarging.

10. The method of copy images of claim 8, wherein $\beta$ is greater than 50%.

11. A copying apparatus comprising:

image sensing means for reading an original image and outputting image data corresponding to the read image;

selection means for selecting a target enlargement factor;

first processing means, coupled to said image sensing means and said selection means, for a) contracting the image data to reduce a size of the image by a contraction factor $\beta=\alpha/\gamma$ when a non-integer target enlargement factor is selected by said selection means to output contracted image data, wherein $\gamma$ is an integer number greater than $\alpha<\gamma$ and $\alpha$ is the non-integer target enlargement factor, and b) outputting the image data provided from said image sensing means when an integer target enlargement factor is selected by said selection means;

second processing means, coupled to said selection means and said first processing means, for a) enlarging the contracted image data output from said first processing means by $\gamma$ upon selection of the non-integer target enlargement factor to enlarge the image by the non-integer target enlargement factor, to output enlarged image data and b) enlarging the image data output from said first processing means by the integer target enlargement factor to enlarge the image upon selection of the integer target enlargement factor, to output enlarged image data; and printing means, coupled to said second processing means, for printing the enlarged image using the enlarged image data.

12. The copying apparatus of claim 11, wherein said second processing means performs pseudo half tone processing on the contracted image data and the image data prior to enlargement.

13. The copying apparatus of claim 11, wherein $\beta$ is greater than 50%.

14. A method of copying images comprising the steps of:
a) optically sensing an original image to provide image data corresponding to the sensed image;
b) selecting a target enlargement factor;
c) contracting the image data to reduce a size of the image by a contraction factor $\beta=\alpha/\gamma$ when a non-integer target enlargement factor is selected in said step b) to provide contracted image data, wherein $\gamma$ is an integer number greater than $\alpha<\gamma$ and $\alpha$ is the non-integer target enlargement factor;
d) enlarging the contracted image data of said step c) by $\gamma$ upon selection of the non-integer target enlargement factor to enlarge the image by the non-integer target enlargement factor to provide enlarged image data;
e) enlarging the image data of said step a) by an integer target enlargement factor to enlarge the image upon selection of the integer target enlargement factor in said step b) to provide enlarged image data; and
f) printing the enlarged image using the enlarged image data.

15. The method of copying images of claim 14, wherein said steps d) and e) comprise performing pseudo half tone processing on the contracted image data and the image data respectively prior to enlargement.

16. The method of enlargement of claim 15, wherein $\beta$ is greater than 50%.

* * * * *